United States Patent
Bhangria et al.

(10) Patent No.: US 11,461,053 B2
(45) Date of Patent: Oct. 4, 2022

(54) DATA STORAGE SYSTEM WITH SEPARATE INTERFACES FOR BULK DATA INGESTION AND DATA ACCESS

(71) Applicant: Amazon Technologies, Inc., Seattle, WA (US)

(72) Inventors: Mukesh Kumar Bhangria, Hyderabad (IN); Vipin A, Palakkad (IN); Aditya Abhas, Patna (IN); Venkata Satya Srujan Kanumuri, Hyderabad (IN); Shiva Kumar Korikana, Hyderabad (IN); Umang Popli, Hyderabad (IN); Amit Kumar Rai, Hyderabad (IN); Pallav Milankumar Shah, Ahmedabad (IN)

(73) Assignee: Amazon Technologies, Inc., Seattle, WA (US)

( * ) Notice: Subject to any disclaimer, the term of this patent is extended or adjusted under 35 U.S.C. 154(b) by 120 days.

(21) Appl. No.: 16/872,270

(22) Filed: May 11, 2020

(65) Prior Publication Data
US 2020/0272335 A1    Aug. 27, 2020

Related U.S. Application Data

(63) Continuation of application No. 16/019,304, filed on Jun. 26, 2018, now Pat. No. 10,684,801.

(51) Int. Cl.
*G06F 3/06* (2006.01)
*H04L 67/1097* (2022.01)
(Continued)

(52) U.S. Cl.
CPC ............ *G06F 3/067* (2013.01); *G06F 3/0631* (2013.01); *G06F 3/0637* (2013.01);
(Continued)

(58) Field of Classification Search
CPC ... H04L 67/1097; H04L 29/08; G06F 16/278; G06F 16/25; G06F 3/0637; G06F 3/0631; G06F 16/86; G06F 3/067; G06F 3/0617; G06F 3/0635; G06F 16/27; G06F 16/84; G06F 3/06
See application file for complete search history.

(56) References Cited

U.S. PATENT DOCUMENTS 7,437,609 B2   10/2008   Anderson, Jr. et al.
7,853,561 B2   12/2010   Holenstein et al.
(Continued)

OTHER PUBLICATIONS

U.S. Appl. No. 15/051,560, filed Feb. 23, 2016, Karthik Tamilmani.
(Continued)

*Primary Examiner* — Pierre Michel Bataille
(74) *Attorney, Agent, or Firm* — Alexander A. Knapp; Kowert, Hood, Munyon, Rankin & Goetzel, P.C.

(57) ABSTRACT

Methods, systems, and computer-readable media for a bulk ingestion interface for a distributed data storage system are described. A bulk ingestion interface may allow bulk data to be ingested into a distributed data storage system using compute resources separate from respective compute resources of the distributed data storage system used to perform access requests to datasets stored on one or more resource hosts of the distributed data storage system.

20 Claims, 13 Drawing Sheets

(51) Int. Cl.
  *G06F 16/84* (2019.01)
  *G06F 16/27* (2019.01)

(52) U.S. Cl.
  CPC ............ *G06F 16/278* (2019.01); *G06F 16/86* (2019.01); *H04L 67/1097* (2013.01)

(56) References Cited

U.S. PATENT DOCUMENTS

| | | | |
|---|---|---|---|
| 8,121,978 | B2 | 2/2012 | Wiss et al. |
| 8,639,660 | B1 | 1/2014 | Ou |
| 8,874,508 | B1 | 10/2014 | Mittal |
| 8,977,594 | B2 | 3/2015 | Whitehead et al. |
| 9,258,930 | B2 | 2/2016 | Gardner et al. |
| 9,423,962 | B1 | 8/2016 | Basham et al. |
| 9,569,634 | B1 | 2/2017 | Yanacek et al. |
| 9,639,546 | B1 | 5/2017 | Gorski et al. |
| 10,944,814 | B1 * | 3/2021 | Virtuoso ............... H04L 47/803 |
| 2013/0198560 | A1 | 8/2013 | Grube et al. |
| 2015/0019614 | A1 | 1/2015 | Pierre-March |
| 2016/0092484 | A1 * | 3/2016 | Finkler ................. G06F 16/258 707/715 |
| 2016/0299957 | A1 | 10/2016 | A. C. et al. |
| 2018/0076931 | A1 | 3/2018 | Gladwin et al. |
| 2018/0107397 | A1 | 4/2018 | Gray et al. |
| 2018/0213018 | A1 * | 7/2018 | Madani ................. H04L 67/561 |
| 2018/0357017 | A1 | 12/2018 | Karr et al. |
| 2019/0220459 | A1 * | 7/2019 | Huang ................ G06F 16/2255 |
| 2019/0258637 | A1 * | 8/2019 | Bhattacharjee ... G06F 16/24549 |

OTHER PUBLICATIONS

U.S. Appl. No. 15/493,047, filed Apr. 20, 2017, Steven Eric Schiesser.
U.S. Appl. No. 15/431,708, filed Feb. 13, 2017, David Craig Yanacek, et al.
U.S. Appl. No. 15/583,921, filed May 1, 2017, Christopher Albert Gorski et al.
U.S. Appl. No. 14/485,003, filed Sep. 12, 2014, Srinivasan Sundar Raghavan et al.
U.S. Appl. No. 16/019,304, filed Jun. 26, 2018, Mukesh Kumar Bhangria et al.

* cited by examiner

DATA STORAGE SYSTEM WITH SEPARATE INTERFACES FOR BULK DATA INGESTION AND DATA ACCESS

RELATED APPLICATION

This application is a continuation of U.S. application Ser. No. 16/019,304, filed Jun. 26, 2018, which is hereby incorporated by reference herein in its entirety.

BACKGROUND

Many companies and other organizations operate computer networks that interconnect numerous computing systems to support their operations, such as with the computing systems being co-located (e.g., as part of a local network) or instead located in multiple distinct geographical locations (e.g., connected via one or more private or public intermediate networks). For example, distributed systems housing significant numbers of interconnected computing systems have become commonplace. Such distributed systems may provide back-end services to web servers that interact with clients. Such distributed systems may also include data centers that are operated by entities to provide computing resources to customers. Some data center operators provide network access, power, and secure installation facilities for hardware owned by various customers, while other data center operators provide "full service" facilities that also include hardware resources made available for use by their customers.

As the scale and scope of distributed systems have increased, the tasks of provisioning, administering, and managing the resources have become increasingly complicated. A distributed system referred to as a provider network may offer, to various customers, access to computing resources and services implemented using the distributed system. When customers access such resources remotely, the resources may be said to reside "in the cloud" and may represent cloud computing resources. For example, using such resources, the provider network may store data on behalf of customers in various types of storage solutions. The provider network may offer various types of services for managing the cloud computing resources, including storage-related services for managing stored data.

Figure 1:
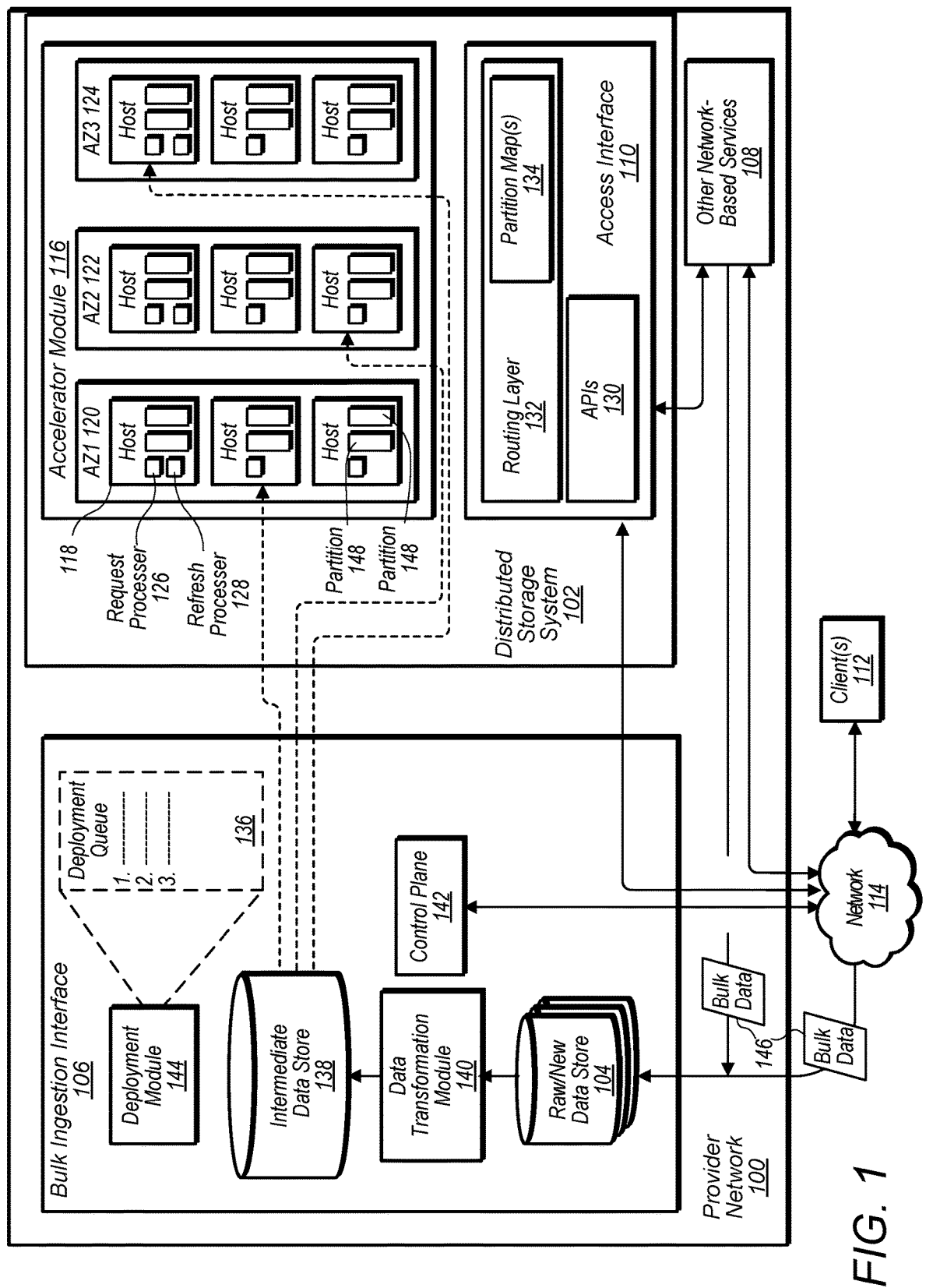
FIG. 1 illustrates an example system environment that includes a distributed data storage system, a bulk ingestion interface, and a separate access interface, according to some embodiments.

While embodiments are described herein by way of example for several embodiments and illustrative drawings, those skilled in the art will recognize that embodiments are not limited to the embodiments or drawings described. It should be understood, that the drawings and detailed description thereto are not intended to limit embodiments to the particular form disclosed, but on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning "having the potential to"), rather than the mandatory sense (i.e., meaning "must"). Similarly, the words "include," "including," and "includes" mean "including, but not limited to."

DETAILED DESCRIPTION OF EMBODIMENTS

Various embodiments of methods, systems, and computer-readable media for ingesting raw bulk data (also referred to herein as "new bulk data") into a data storage system, such as a NoSQL database, using an interface and data flow that are separate from an access interface and access data flow for the data storage system are described.

In some embodiments, a system includes a plurality of resource hosts configured to store datasets for clients of a data storage system, one or more computing devices configured to implement an access interface for the data storage system, and one or more computing devices configured to implement a bulk ingestion interface for the data storage system. The access interface is configured to receive access requests from clients of the data storage system, wherein respective amounts of compute resources of the data storage system are allocated to respective ones of the clients for performing access requests. Also, the bulk ingestion interface is configured to receive an indication of new bulk data to be stored in the data storage system for one or more of the clients. Additionally, the bulk ingestion interface is configured to generate one or more formatted datasets from the new bulk data, wherein the one or more formatted datasets are formatted in accordance with a format supported by the data storage system. The bulk ingestion interface is also configured to provide an indication that the one or more formatted datasets are available to be stored on one or more of the resource hosts of the data storage system, wherein ingestion of the new bulk data into the data storage system via the bulk ingestion interface is performed using compute resources separate from the respective amounts of compute resources of the data storage system allocated to the respective clients to perform access requests. For example, in some embodiments, a client of a data storage system, such as a NoSQL database, may store new bulk data to another data store, such as an object-based storage system. The client may then send a notification to a bulk ingestion interface of the data storage system indicating objects stored in the object-based storage system that are to be ingested into the NoSQL database. In response, the data storage system may bulk ingest the objects into the NoSQL database, while continuing to perform access requests directed to datasets already included in the NoSQL database.

This may be done using separate compute resources and/or separate compute resource allocations. For example, a data volume ingestion capacity that significantly exceeds the client's allocated data volume access capacity may be temporarily allocated to perform the bulk ingestion of the objects from the object-based storage system into the NoSQL database. After the bulk ingestion is complete, the temporarily allocated compute resources may be reclaimed by the distributed data storage system for other uses, such as performing bulk ingestions for other clients. In some embodiments, once the objects are ingested into the NoSQL database, the bulk ingestion interface may cause one or more routing elements to "flip" to a new mapping that includes the newly ingested bulk data. Once the NoSQL database has "flipped" to the new mapping, subsequently received access requests may be routed to data items included in the ingested bulk data, wherein the access requests are routed according to the new mapping. In some embodiments, a client may instruct the NoSQL database to "flip" to the new mapping via an API. Also, in some embodiments, a client may instruct the NoSQL database to revert to one or multiple previous versions via an API.

In some embodiments, a method includes receiving an indication of bulk data to be stored in a distributed data storage system via a bulk ingestion interface of the distributed data storage system. The method also includes generating one or more formatted datasets from the bulk data, wherein the one or more formatted datasets are formatted in accordance with a format supported by the distributed data storage system. Furthermore, the method includes providing an indication that the one or more formatted datasets are available to be stored to one or more resource hosts, wherein ingestion of the bulk data via the bulk ingestion interface is performed using compute resources separate from respective compute resources of the distributed data storage system allocated to a client to perform access requests to datasets stored on the one or more resource hosts.

In some embodiments, a non-transitory computer-readable medium stores program instructions, that when executed by one or more processors, cause the one or more processors to implement a bulk ingestion interface, wherein the bulk ingestion interface is configured to receive an indication of bulk data to be stored in the distributed data storage system. The bulk ingestion interface is further configured to generate one or more formatted datasets from the bulk data, wherein the one or more formatted datasets are formatted in accordance with a format supported by the distributed data storage system. Additionally, the bulk ingestion interface is configured to provide an indication that the one or more formatted datasets are available to be stored on one or more resource hosts of the distributed data storage system, wherein the bulk data is ingested into the distributed data storage system using compute resources separate from respective compute resources of the distributed data storage system allocated to a client to perform access requests to datasets stored on the one or more resource hosts.

In some database systems clients are allocated a combined data volume access and ingestion capacity to access data stored in the database system and to store data to the database system. Also, some database system clients may perform frequent read requests on the database system and infrequently upload bulk data to the database system. For example, a client may upload bulk data, such as a snapshot, to the database once a day, once a week, etc. and perform access requests to the database continuously throughout the day, week, etc. In such situations, an amount of bulk data to be uploaded at any given time may be significantly larger than a size of data involved in access requests performed on the database system, such as read requests. For example, in some situations, a client may bulk upload snapshots with data sizes exceeding 1 terabyte, but may perform access requests on the database system, outside of the bulk ingestion, that involve much smaller data sizes. In database systems that allocate a combined data volume access and ingestion capacity to both access data stored in the database system and to add data to the database system, the allocated data volume access and ingestion capacity may be insufficient to timely upload bulk data. Conversely, systems that are designed to support timely upload of bulk data may have excess data volume access and ingestion capacity that goes unused when bulk data is not being uploaded. Additionally, many database systems regardless of resource allocations are not designed and structured to support timely uploads of large amounts of bulk data while also being able to perform access requests at high transaction rates and with low latency.

In some embodiments, in order to provide a distributed data storage system, such as a NoSQL database, that timely uploads bulk data and that also performs read operations at high transaction rates and with low latency a distributed data storage system may include separate interfaces for bulk ingestion of bulk data and access to data already stored in the distributed data storage system. In some embodiments, a bulk ingestion interface may be implemented using separate compute resources and/or separate compute resource allocations than compute resources and/or compute resource allocations that are used to implement an access interface of the distributed data storage system. The separation of the bulk ingestion interface from the access interface may allow compute resources that support a high data volume ingestion rate to be allocated to perform a bulk ingestion operation without the compute resources being allocated continuously to perform the bulk ingestion operation and therefore being wasted when a bulk ingestion operation is not being performed. Also, in some embodiments, a distributed data storage system may be a multi-tenant system that supports multiple clients. Thus, compute resources used to perform a bulk ingestion for a first client may also be used by additional clients when the first client is not performing a bulk ingestion operation. Additionally, because in most circumstances different clients will perform bulk ingestion operations at different times, a distributed data storage system with a separate bulk ingestion interface may more efficiently use compute resources (as compared to previous distributed data storage systems) by re-using compute resources to perform bulk ingestion for various clients. Moreover, because a bulk ingestion interface may use separate compute resources (separate from access interface compute resources), a bulk ingestion operation may be performed while the distributed data storage system continues to provide a guaranteed level of throughput for access operations, without the bulk ingestion operation significantly affecting the distributed data storage system's ability to perform access operations.

FIG. 1 illustrates an example system environment that includes a distributed data storage system, a bulk ingestion interface, and a separate access interface, according to some embodiments.

Provider network 100 includes distributed data storage system 102, raw/new data store 104, bulk ingestion interface 106, and other network based services 108. In some embodiments, the distributed data storage system 102 may be a multi-tenant distributed data storage system. The distributed data storage system may offer dynamic sizing to clients such that the available capacity for a particular client's storage needs may be increased dynamically, e.g., using storage resources from a provider network, such as provider network 100, in response to the client requesting a larger or smaller storage resource. In some embodiments, the distributed data storage system 102 may include any suitable number and configuration of storage tiers implemented using any suitable storage subsystems and/or storage services.

In some embodiments, data elements stored in the distributed data storage system 102 may include key-value pairs, and the key-value pairs may be organized into data structures referred to as scopes or tables. The data elements (e.g., key-value pairs) and/or data structures that contain them (e.g., scopes or tables) may be specific to particular clients, such that a particular data element or data structure may be said to belong to a particular client or to be owned by a particular client. The client that owns particular data elements may have access to read, write, or modify those data elements, in some cases exclusive of other clients. As another example, in the raw/new data store 104, raw or new bulk data may be structured as one or more objects and stored in secure, durable, highly scalable object storage in storage locations referred to as "buckets." For example, in Amazon's simple storage service (S3), an S3 object may include data, a key, and metadata, wherein the object key (or key name) uniquely identifies the key-addressable object in a bucket. Also, an index of such keys may also be maintained. In some embodiments, an object, such as an S3 object, may include raw data that is later used to generate multiple data elements to be stored in distributed data storage system 102. For example a data object may include data comprising java object script notation (JSON) objects, comma separated values (CSV), tab separated values (TSV), Amazon ION objects, etc.

In some embodiments, distributed data storage system 102 may implement various storage services, such as a relational database service, a non-relational or NoSQL database service, and so on. A client of such a storage-related service may programmatically request the establishment of an instance of a database that can be used for numerous database tables or scopes and associated metadata such as indexes and the like. In the case of a database, operations such as creates, updates, and deletes may be supported at the record level, and for various metadata objects such as indexes, views, and the like. Clients may also issue read requests of various kinds, such as queries in the case of database objects.

A provider network, such as provider network 100, may offer access to resources and services, such as bulk ingestion interface 106 and distributed storage system 102 (and its constituent storage services and/or subsystems, such as access interface 110), using multi-tenancy. In one embodiment, one or more clients (e.g., as represented by client(s) 112) may be external to the provider network 100. The client(s) 112 and provider network 100 may be coupled through the one or more networks 114. The provider network may offer the client(s) 112 access to the bulk ingestion interface 106, raw/new data store 104, distributed data storage system 102, and other network-based services 108 based on a fee arrangement or other billing arrangement. Any suitable user interfaces and/or programmatic interfaces for the bulk ingestion interface 106 may be exposed to the client(s) 112, including one or more APIs or web-based user interfaces. Using the techniques described herein, data may be bulk ingested on behalf of one or more of client(s) 112 from outside the provider network 100 (e.g., from a source data store on client-managed premises or otherwise accessible to the client via the raw/new data store 104) to resources of the distributed data storage system 102 of the provider network 100. Using the techniques described herein, data may also be bulk ingested from a source data store within the provider network 100 to resources of the distributed data storage system 102 of the provider network 100, such as from raw/new data store 104 or other network-based services 108.

Provider network 100 may include a network set up by an entity (such as a company or a public sector organization) to provide one or more services (such as various types of multi-tenant and/or single-tenant cloud-based computing or storage services) accessible via the Internet and/or other networks to a distributed set of clients 112. Provider network 100 may include numerous data centers hosting various resource pools, such as collections of physical and/or virtualized computer servers, storage devices, networking equipment and the like (e.g., implemented using computing systems 1000 as described below with regard to FIG. 10), needed to implement, configure and distribute the infrastructure and services offered by the provider network. Within large provider networks, some data centers may be located in different cities, states, or countries than others, and in some embodiments the resources allocated to a given application or service may be distributed among several such locations to achieve desired levels of availability, fault-resilience, and performance. For example, data centers may be located in different availability zones of a provider network.

In some embodiments, client(s) 112 may be configured to generate network-based service requests according to a Representational State Transfer (REST)-style network-based services architecture, or another suitable network-based services architecture. In various embodiments, network(s) 114 may encompass any suitable combination of networking hardware and protocols necessary to establish network-based communications between client(s) 112 and provider network 100. For example, the network(s) 114 may generally encompass the various telecommunications networks and service providers that collectively implement the Internet. The network(s) 114 may also include private networks such as local area networks (LANs) or wide area networks (WANs) as well as public or private wireless networks. For example, both a given computing device of a client 112 and the provider network 100 may be respectively provisioned within enterprises having their own internal networks. In such an embodiment, the network(s) 114 may include the hardware (e.g., modems, routers, switches, load balancers, proxy servers, etc.) and software (e.g., protocol stacks, accounting software, firewall/security software, etc.) necessary to establish a networking link between the given client computing device 112 and the Internet as well as between the Internet and the provider network 100. It is noted that in some embodiments, client computing devices 112 may communicate with provider network 100 using a private network rather than the public Internet.

In some embodiments, distributed data storage system 102 includes access interface 110 and accelerator module 116. The accelerator module 116 may be implemented across one or more resource hosts such as one or more of resource hosts 118. For example, a resource host may be a physical server that includes storage and compute components that are used to store data for distributed data storage system 102 and implement accelerator module 116. In some embodiments, resource hosts, such as resource hosts 118, may be included in a plurality of availability zones of a provider network, such as different data centers in different physical locations. For example, provider network 100 includes availability zones 120, 122, and 124 each comprising a plurality of resource hosts 118. In some embodiments, a provider network may include any number of availability zones, and each availability zone may include any number of resource hosts. The access interface 110 includes one or more access interface APIs such as a "Get" API, a "Batch-get" API, a "Query" API, a "Scan" API, etc. An API call to one of the access interface APIs 130 may be routed via a routing layer 132 according to a partition map 134 stored in the routing layer 132. In some embodiments, the routing layer 132, may be a stateless distributed service comprising a plurality of routers, switches, and/or other networking devices. The routing layer 132 may route an incoming request received via one of the access interface APIs 130 to an appropriate resource host 118 based on the partition map 134. In some embodiments, the routing layer may perform load-balancing, access control, and/or authorization checks for access requests received via the access interface APIs 130.

In some embodiments, the accelerator module 116 is a distributed service that serves get/query access requests from partitions of datasets stored on the resource hosts 118. In some embodiments, an accelerator module, such as accelerator module 116, includes a request processor 126 and a refresh processor 128. In some embodiments, the request processor 126 responds to get/query requests. For example, in some embodiments, each resource host 126 may include a request processor 126 to respond to get/query requests directed to dataset partitions stored on the respective resource host. Also, in some embodiments, one or more resource hosts associated with an accelerator module, such as accelerator module 116, may include a refresh processor, such as refresh processor 128. In some embodiments, a refresh processor may be a software module implemented via one or more processors of resource hosts 118. In some embodiments, refresh processor 128 may be implemented in hardware. In some embodiments, a refresh processor, such as refresh processor 128, may poll a bulk ingestion interface for notifications of new formatted datasets that are ready to be uploaded to resource hosts associated with an accelerator module, such as resource hosts 118 associated with accelerator module 116. In some embodiments, a refresh processor, such as refresh processor 128, may receive notifications from a bulk ingestion interface indicating that one or more formatted data sets are ready to be downloaded to resource hosts associated with an accelerator module. In some embodiments, a refresh processor, such as refresh processor 128, may coordinate downloading partitions of a formatted data set to assigned resource hosts from an intermediate data store, such as intermediate data store 138. In some embodiments, a refresh processor may download formatted dataset partitions to assigned resource host nodes according to assignments included in a deployment queue of a deployment module, such as deployment queue 136 of deployment module 144.

In some embodiments, a refresh processor, such as refresh processor 128, may alert an accelerator module 116 of other storage tasks generated by a deployment module, such as deployment module 144, and included in a deployment queue, such as tasks for relocating partitions to balance partitions across resource hosts, deleting older versions of partitions of a dataset that have been superseded, etc. In response, the accelerator module may perform the other tasks included in the deployment queue by the deployment module, such as relocating partitions to balance partitions across resource hosts, deleting older versions of partitions of a dataset that have been superseded, etc.

It is worth noting, that as used here within a "dataset" may refer to a logical group of key-value pairs (similar to a table or scope) that are represented by a dataset name. Within a dataset, a "key" is unique and a "value" associated with a key may be an arbitrary bit array. Also, a "partition" may be a slice of a dataset associated with a range of keys.

In some embodiments, a resource host may implement a plurality of resource instances, and a "node ID" may map to a particular resource instance on a resource host. In some embodiments, a partition may be assigned to a resource host or a resource instance of a plurality of resource instances implemented on a resource host (e.g. a node ID). In some embodiments, a resource instance may maintain a list of partitions assigned to the resource instance and store the list in a local memory of the resource instance. Additionally, as described in more detail below, in some embodiments, each partition may be assigned to multiple node IDs of resource instances implemented on resource hosts in different availability zones. In this way, a failure of a single or possibly multiple resource hosts does not necessarily cause partition data to be lost or become unavailable. Additionally, because there are multiple copies of the same partition stored on different nodes, access requests directed to a given partition may be load balanced across the multiple resource instances/resource hosts to increase throughput of access requests. In some embodiments, a "partition map" may be a mapping between key ranges of a partition and a resource host that can serve the keys included in the partition. In some embodiments, a given key may be mapped to multiple nodes implemented on resource hosts in multiple availability zones. In some embodiments, partitions may be assigned to nodes of resource hosts using a shuffle sharding technique.

In some embodiments, in order to perform a bulk data ingestion of new/raw data, a client, such as one of clients 112, may first store the bulk data to a raw/new data store, such as of an additional data storage service (e.g. an object-based storage service) of a provider network. For example, client 112 stores bulk data 146 to raw/new data store 104. The bulk data 146 may be unformatted data, or may be formatted in one or more formats other than a format used by distributed data storage system 102 to store data elements. For example, bulk data 146 may include JSON objects, comma separated values (CSV), tab separate values (TSV), etc. The bulk data may be stored as one or more data objects in an object-based storage wherein each data object includes multiple JSON objects, comma separated values, tab separated values, etc. The client may also initiate bulk ingestion of the data stored in the raw/new data store via an API call to a control plane of a bulk ingestion interface, such as control plane 142 of bulk ingestion interface 106. The client may indicate, via an API of the control plane, storage locations for data objects stored in the raw/new data store 104 that are to be ingested into the distributed data storage system 102. Additionally, the client may indicate characteristics of the data that is to be ingested, such as whether the data is a new snapshot, a delta that shows changes relative to a previous snapshot, etc. In some embodiments, the client may indicate tag information for the bulk data to be ingested, such as a timestamp, name, version number, batch label, etc.

In some embodiments, a control plane, such as control plane 142, also manages a client on-boarding process and may be a control plane for both the bulk ingestion interface 106 and the distributed data storage system 102. In some embodiments, control plane 142 manages provisioning of storage resources to clients 112 on resource hosts 118, tracking client usage metrics of provisioned storage resources, alarms, billing, etc. In some embodiments, control plane 142, may also include a "get status" API that allows clients to inquire about at status of a bulk ingestion, such as where the bulk data is currently at in the bulk ingestion process. For example, a "get status" API may indicate that bulk data is stored in a raw/new data store awaiting formatting, or may indicate that bulk data has been formatted and is stored in an intermediate data store awaiting download to resource hosts of the distributed data storage system.

In some embodiments, a control plane may also provide life cycle management for data, such as providing notifications when previous versions of data stored in distributed data storage system 102 are to be cycled out of the distributed data storage system due to being replaced with subsequent versions. For example, in some embodiments, a distributed storage system, such as distributed storage system 102, may store up to "N" data versions and may cycle out older data versions beyond "N" as new data versions are added to the distributed data storage system. In some embodiments, during on-boarding of a client, the client may configure/update various parameters for storage resources to be allocated to the client, such as data storage size, transactions per second (TPS) supported for access requests, frequency of updates (for example, via bulk ingestion), etc. In some embodiments, a control plane, such as control plane 142, provides visibility to a client through a monitor portal, wherein the client can view usage metrics, alarms, alarm settings, etc.

Once a client has stored bulk data for ingestion to a raw/new data store, such as raw/new data store 104, and made an API call to a bulk ingestion interface, such as to control plane 142 of bulk ingestion interface 106, to initiate bulk ingestion, a data transformation module, such as data transformation module 140, may format the raw/new data for ingestion into the distributed data storage system. For example, data transformation module 140 may sort and merge the raw/new data included in data objects stored in the raw/new data store. Furthermore, the data transformation module 140 may create one or more formatted datasets from the sorted and merged raw data, wherein the formatted datasets are organized into key-value pairs. For example, in the case of comma separated values, each value may be assigned a key, such that the comma separated value and its associated key form a key-value pair. Additionally, the data transformation module 140 may partition the one or more datasets into one or more partitions, wherein the partitions are organized based on key ranges. In some embodiments, a number of partitions to be created for a given dataset may be based on client configurations for provisioned storage instances. For example, a guaranteed high throughput level such as 30,000 read transactions per second, as an example, may require a data set to be divided into multiple partitions (taking into account the TPS capacities of the respective hosts, etc.). In some embodiments, a number of partitions to be created for a given dataset may be based on infrastructure characteristics of the distributed data storage system, such as how much data each resource host can store and how many transactions per second each resource host can perform.

In some embodiments, a data transformation module, such as data transformation module 140, may be implemented using another network-based service of a provider network, such as one of the network-based serviced of other network-based services 108. For example, in some embodiments, data transformation module 140 may be implemented using an elastic map reduce service or a Hadoop based service of a provider network.

After generating formatted datasets and/or formatted dataset partitions from the raw/new bulk data stored in the raw/new bulk data store 104, the data transformation module 140 may store the formatted datasets and/or formatted dataset partitions to an intermediate data store 138. In some embodiments, an intermediate data store, such as intermediate data store 138, may store multiple versions of bulk data being ingested into a distributed data storage system. In some embodiments, the intermediate data store 138, may be implemented using an object-based storage system. For example, data objects stored in a first bucket of an object-based storage system may be data-objects associated with new/raw data store 104 and generated formatted datasets generated from these data objects may be stored as objects in another bucket of the object-based storage system associated with intermediate data store 138.

In some embodiments, a deployment module, such as deployment module 144, may orchestrate the refreshing of new versions of data or datasets stored on resource hosts 118 using the formatted datasets and/or formatted dataset partitions stored in the intermediate data store 138. In some embodiments, the deployment module 144 may not actually move partitions from the intermediate data store 138 to the resource hosts 118, but may instead notify participating components such as a refresh processor 128 of an accelerator module 116 that datasets are to be updated and/or discarded.

In some embodiments, a deployment module, such as deployment module 144 also assigns partitions to resource hosts or resource host groups. In some embodiments, a deployment module, such as deployment module 144, may rebalance which partitions are stored on which resource hosts based on client configurations, system infrastructure, and/or network throughput. For example, a deployment module 144, may maintain a deployment queue 136 of storage actions to be taken by resource hosts associated with an accelerator module 116. In some embodiments, a refresh processor 128 and/or an accelerator module 116 may pull a next task from a deployment queue 136 and notify the deployment module 144 when the task is complete. The deployment module may then remove the task from the deployment queue 136.

For example, a storage task included in a deployment queue may be to store a particular formatted dataset partition stored in the intermediate data store 138 to an assigned node of a resource host 118. In response to a refresh processor 128 being notified of the storage task, the refresh processor 128 may cause the assigned node to download the assigned partition from the intermediate data store 138 in coordination with the accelerator module 116. For example FIG. 1 illustrates partitions 148 stored in respective ones of resource hosts 118, wherein some of the partitions 148 are being updated with new formatted dataset partitions from intermediate data store 138.

Once the new partitions are stored to the assigned resource hosts, the deployment module 144 may provide an updated partition map to the routing layer 132. In some embodiments, the deployment module 144 may then instruct the routing layer 132 to "flip" to using the new partition map instead of a previous partition map version to route access requests. The routing layer may then begin to route access requests according to the new version of the partition map.

In some embodiments, the deployment module 144 may also provide an updated partition map to the accelerator module 116. In some embodiments, the accelerator module 116 may download partitions to assigned resource hosts from an intermediate data store 138, based on assignments indicated in an updated partition map.

In some embodiments, the deployment module 144 may cause a notification to be sent to the client, for example via the control plane 142, indicating that the distributed data storage system 102 has been updated to the latest version of the data including the ingested bulk data.

In some embodiments, a deployment module may cause the routing layer to "flip" to routing access requests according to the newest partition map in response to a client instruction to transition to the next version of the data that includes the bulk ingested data. In some embodiments, a deployment module may refrain from "flipping" to a next data version until instructed to do so by a client.

In some embodiments, a routing layer may store multiple partition map versions and resource hosts may store multiple partition versions. In such embodiments, a client may specify a particular data version of a plurality of supported data versions, and a distributed data storage system may revert to a previous specified data version of the data stored in the distributed data storage system. For example, a routing layer may route access request according to a previous version of a partition map, and the previous partition map version may include mappings to previous partition versions that are still stored on the resource hosts.

In some embodiments, a deployment module, such as deployment module 144, may be implemented using another network-based service of a provider network, such as a network-based service of other network-based services 108. For example, in some embodiments, deployment module 144 may be implemented using a step function service of a provider network.

In some embodiments, the formatted datasets and/or formatted dataset partitions may be read-only database (RODB) files.

In some embodiments, a bulk ingestion interface may provide a separate interface and data flow to ingest bulk data into a deployed storage system, wherein a data storage system is deployed on client hosts. For example, a client host may be a compute resource of a provider network that includes both compute capacity and storage capacity. The compute instance may be allocated to a client as a compute instance. In some embodiments, a compute instance may be a physical machine allocated to a client or may be a virtual machine allocated to a client, wherein the virtual machine is implemented on one or more physical compute devices that implement a plurality of virtual machines (e.g. compute instances) for clients of a provider network.

Figure 2:
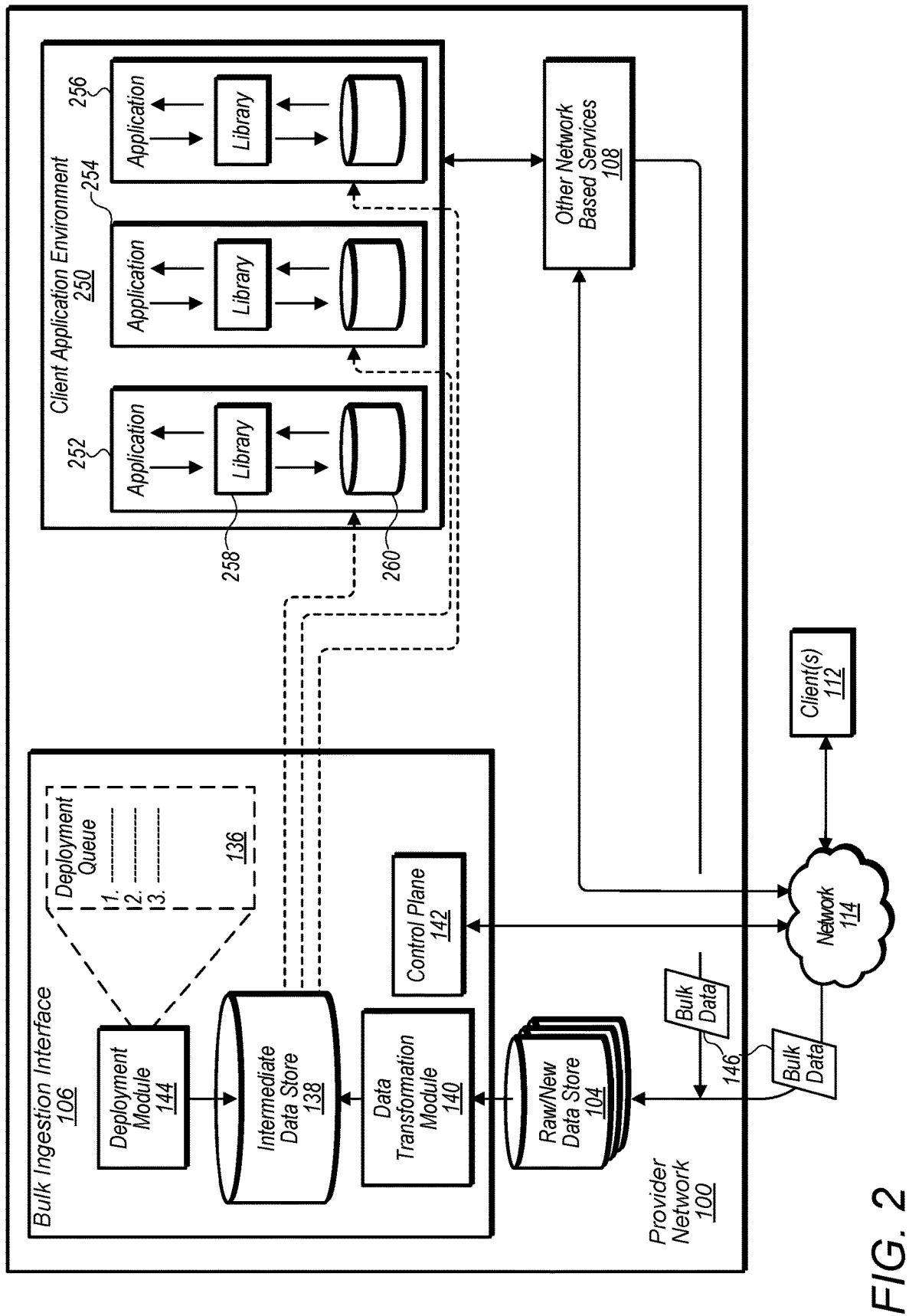
FIG. 2 illustrates an example system environment that includes a distributed data storage system, a bulk ingestion interface, and a separate access interface, wherein at least a portion of the distributed data storage system is implemented using one or more client hosts executing a client application, according to some embodiments.

FIG. 2 illustrates an example system environment that includes a distributed data storage system, a bulk ingestion interface, and a separate access interface, wherein at least a portion of the distributed data storage system is implemented using one or more client hosts executing a client application, according to some embodiments.

In a deployed embodiment, the access interface as described in FIG. 1 may be implemented on a client host, such as one of client hosts 252, 254, or 256. For example, client host 252 includes client library 258, which may act as an access interface for applications executing on client host 252 to data elements stored in storage 260 of client host 252. Client hosts 254 and 256 may include similar components as client host 252. In the deployed embodiment, the routing layer may be omitted because all data elements are stored on the same client host. For example, a full set of partitions for a dataset may be stored on the same client host. This may improve performance by avoiding network calls between an application and a data store that stores data elements requested by the application.

Figure 3A:
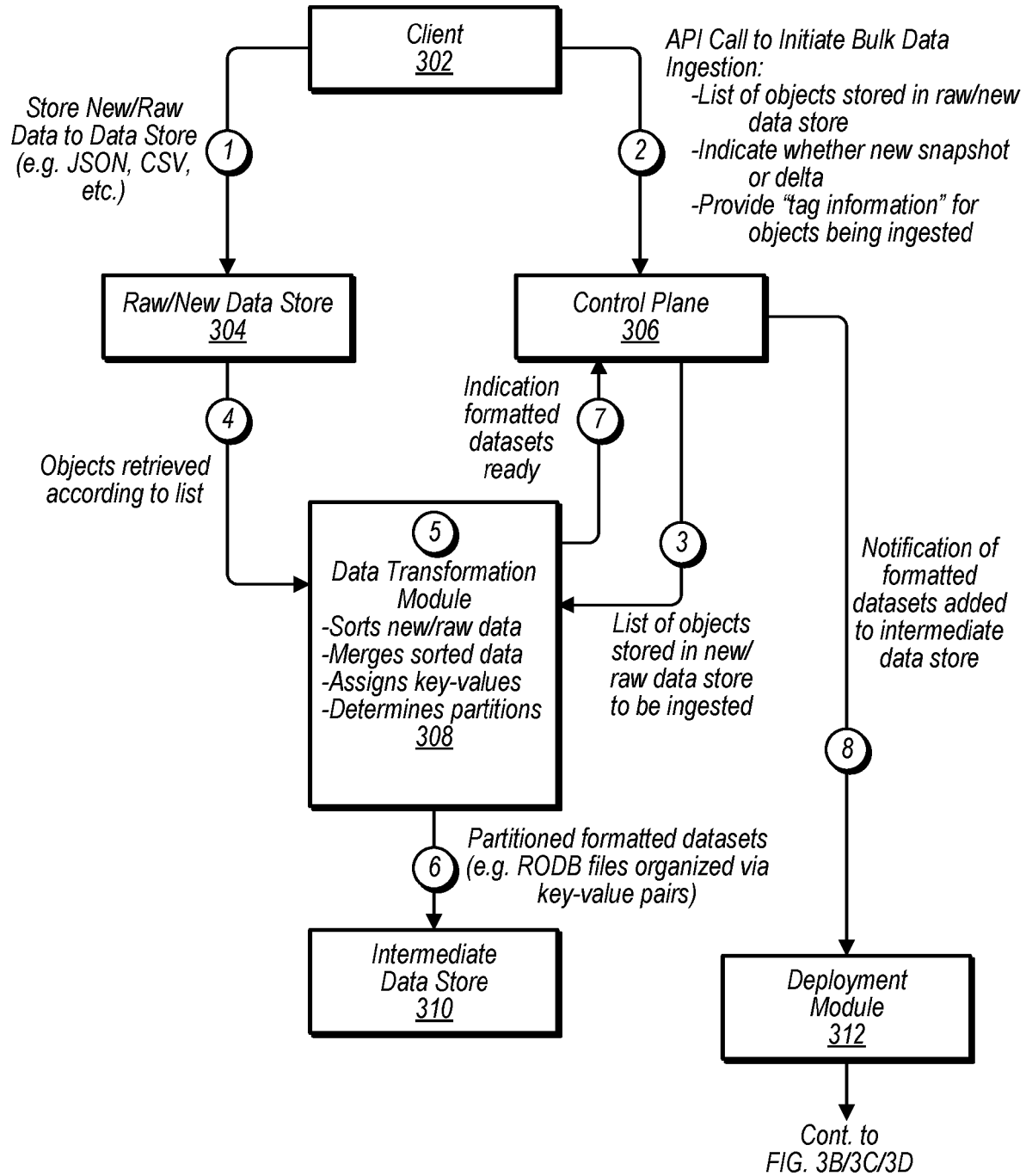
FIG. 3A illustrates a portion of a bulk ingestion process that formats bulk data received via a bulk ingestion interface for deployment into a distributed data storage system, according to some embodiments.

FIG. 3A illustrates a portion of a bulk ingestion process that formats bulk data received via a bulk ingestion interface for deployment into a distributed data storage system, according to some embodiments.

As an initial step 1, client 302 stores new/raw bulk data to be ingested into a distributed data storage system in raw/new data store 304. In some embodiments, the raw/new data may be formatted in various formats, such as JSON objects, comma separated values (CSV), tab separated values (TSV), or other data formats. In some embodiments, the new/raw data store 304 may be a separate data storage service of a provider network in addition to a data storage service to which the raw/new data is being ingested. For example, in some embodiments, the raw/new bulk data may be being ingested into a database storage system, such as a NoSQL database, and the raw/new data may be initially stored to an object-based storage system from which it is then ingested into the database storage system. At step 2, the client 302 may make an API call to an API of a control plane 306 of a bulk ingestion interface to initiate ingestion of the new/raw bulk data from the raw/new data store 304. In some embodiments, the API call may indicate one or more objects stored in the raw/new data store 304 that include the bulk raw/new data to be ingested. Also, in some embodiments, the API call may indicate whether the bulk data to be ingested is snapshot data or a delta that shows changes in the data relative to a previous snapshot without repeating data that has not changed. In some embodiments, the API call may indicate tag information for the bulk data to be ingested, such as a timestamp, name, version number, batch label, etc.

At 3, the control plane 306 may communicate to the data transformation module 308 the list of objects (or storage locations) comprising the bulk data that is to be ingested. At 4, the data transformation module 308 may retrieve the bulk data that is to be ingested from the raw/new data store 304 according to the list of objects or storage locations received from the control plane 306 and provided by client 302. At 5, the data transformation module 308 may sort and merge the raw/new data included in the storage objects and/or stored at the indicated storage locations of the raw/new data store 304. Additionally, the data transformation module 308 may assign keys to data elements included in the raw/new data, such that datasets formatted as key-value pairs are generated from the raw/new data. Additionally, the data transformation module 308 may determine partitions for the formatted datasets and partition the formatted datasets accordingly. For example, the datasets may be partitioned such that different partitions include different key ranges. At 6, the data transformation module 308 may store the formatted and partitioned datasets in intermediate data store 310. In some embodiments, intermediate data store 310 may be implemented as a bucket in an object-based storage system, such as an object-based storage system that provides a different storage bucket for raw/new data store 304. In other embodiments, intermediate data store 310 may be a physical storage device included in a bulk ingestion interface, or other type of storage.

At 7, the data transformation module 308 may provide an indication to control plane 306 that formatted datasets, and partitions thereof, have been generated from the bulk data stored to raw/new data store 304 and are ready to be stored to resource hosts of the distributed data storage system into which the bulk data is to be ingested. In response, at 8, the control plane 306 may provide a notification to the deployment module 312.

Figure 3B:
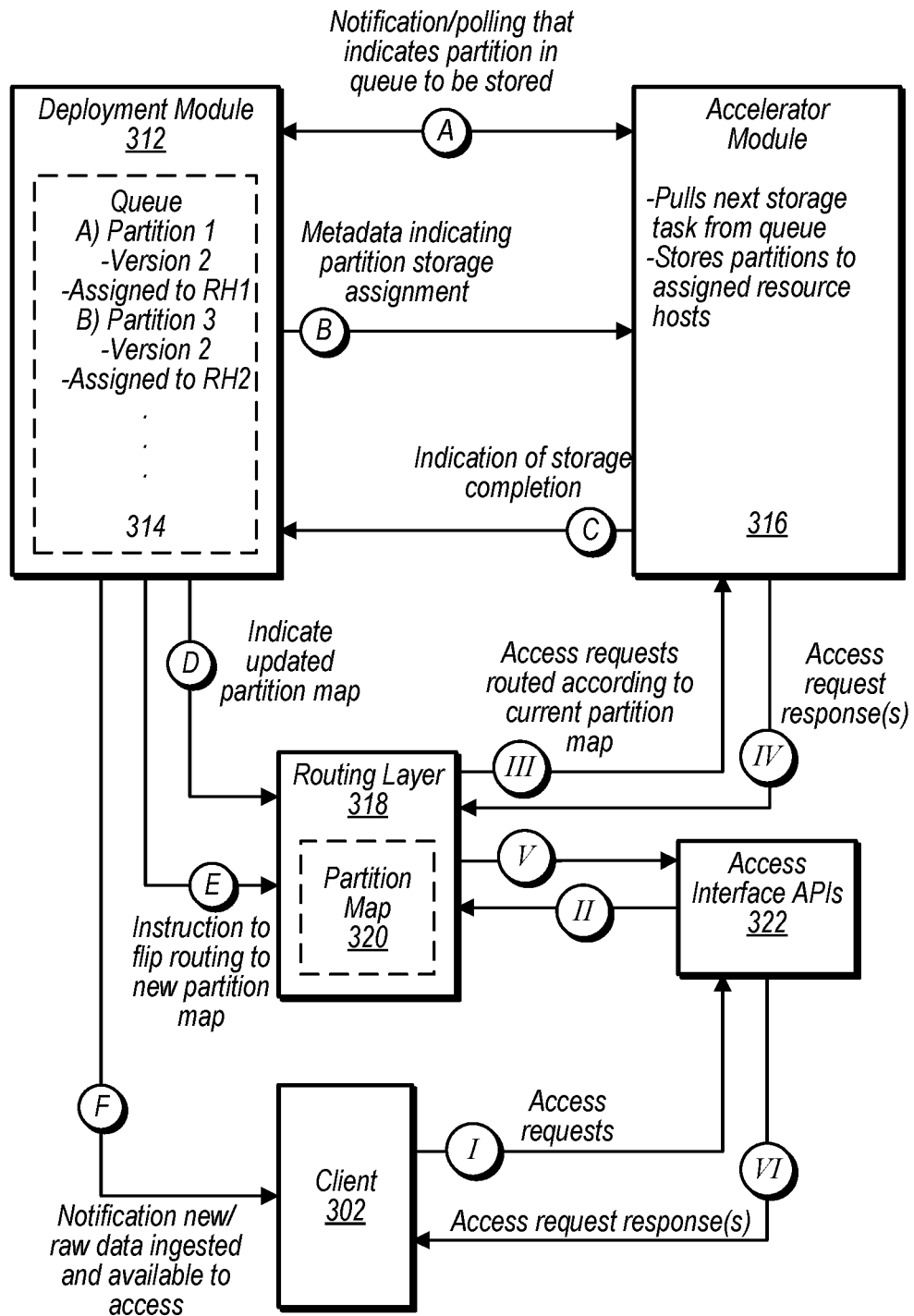
FIG. 3B illustrates another portion of a bulk ingestion process that causes formatted datasets to be deployed to resource hosts of a distributed data storage system, wherein the formatted datasets are made available for client access requests, according to some embodiments.

The process may continue as illustrated in FIGS. 3B/3C/3D. Note that FIGS. 3B/3C/3D illustrate different features that may be supported by a bulk ingestion interface, such as allowing a client to decide when to "flip" a data storage system, such as a database, to a next version and allowing a client to roll a data storage system, such as a database, back to a previous version. While these features are illustrated in different ones of FIGS. 3B/3C/3D, in some embodiments a single bulk ingestion interface may support all or some of these features.

For example, FIG. 3B illustrates another portion of a bulk ingestion process that causes formatted datasets to be deployed to resource hosts of a distributed data storage system, wherein the formatted datasets are made available for client access requests, according to some embodiments.

Subsequent to deployment module 312 receiving, at 8, notification of formatted datasets stored in the intermediate data store 310 that are ready to be deployed, deployment module 312 may add an entry for the formatted datasets to a deployment queue 314. For example the deployment queue may include a list of partitions stored in the intermediate data store 310 that are ready to be deployed. Additionally, the deployment module 312 may assign respective ones of the partitions to respective ones of the resource hosts for deployment. In some embodiments, the deployment queue may also indicate a version associated with the partitions. In some embodiments, a single partition may be assigned to multiple resource hosts in multiple availability zones. Note that FIGS. 3B-3D use letters (e.g. A, B, C, etc.) to indicate further steps in a bulk ingestion process to show differentiation between the various features shown in FIGS. 3B-3D, where the steps shown in each of FIGS. 3B-3D may be taken subsequent to steps 1-8 shown in FIG. 3A. Also, roman numerals are used in FIGS. 3B-3D to indicate steps involved in responding to access requests.

At "A", the deployment module 312 and the accelerator module 316 communicate with each other regarding tasks included in the deployment queue 314. In some embodiments, the accelerator module 316 may poll the deployment module 312 to determine updates to a deployment queue 314, for example via a refresh processor 128 of the accelerator module 316. In some embodiments, a deployment module 312 may send a notification to an accelerator module 316 to indicate updates to a deployment queue 312. When an accelerator module is to perform a deployment task from a deployment queue, the accelerator module may retrieve or be provided metadata indicating partition storage assignments for one or more partitions to be stored as part of the deployment task. In some embodiments, the metadata may further indicate version information for the partition. For example, at "B" the deployment module 312 provides metadata indicating partition storage assignments to accelerator module 316. The accelerator module 316 may then perform the deployment task(s), such as storing a partition from the intermediate data store 310 to an assigned resource host 118. When the deployment task is complete, the accelerator module 316 may send, at "C", an indication to the deployment module 312 that the deployment task has been completed. The deployment module 312 may then update the deployment queue accordingly. In some embodiments, the accelerator module may also or alternatively be provided an updated partition map.

Also, at "D" the deployment module 312 may indicate or provide a new partition map to routing layer 318 that includes updated mappings to include the recently deployed partition(s). The routing layer may save the partition map, as a current partition map 320 that is used to route access requests received from clients 302. In some embodiments, "B" and "D" may be performed in parallel. For example the accelerator module may be provided metadata indicating partition storage assignments and the routing layer may be provided an updated partition map at the same time or at proximate times.

The routing layer may begin to route access requests according to the stored partition map 320 in response to receiving at "E" an indication from the deployment module 312 to "flip" to the new partition map such that access requests are routed according to the new partition map. The deployment module, may also, at "F", send a notification to the client 302 that the new/raw bulk data has been ingested and is now available to be accessed. In some embodiments, the indication sent at "F" may indicate tag information for the ingested new/raw bulk data that has been ingested, such as a timestamp, name, version number, batch, etc.

At "I" client 302 may send an access request to the distributed data storage system via one or more of the access interface APIs 322. The access interface APIs 322 may pass the access request on to the routing layer 318. For example at "II", the access request may be routed to the routing layer. The routing layer 318 may determine the appropriate resource host to route the access request to, based on the current partition map 320. The routing layer 318, at "III", may route the access request to the appropriate resource host. At "IV" the accelerator module 316 may process the request, for example via a request processor 126, and send a response back to the routing layer 318. At "V" the routing layer may route the response to one of the access interface APIs 322. At "VI" the response may be routed to the client 302.

Figure 3C:
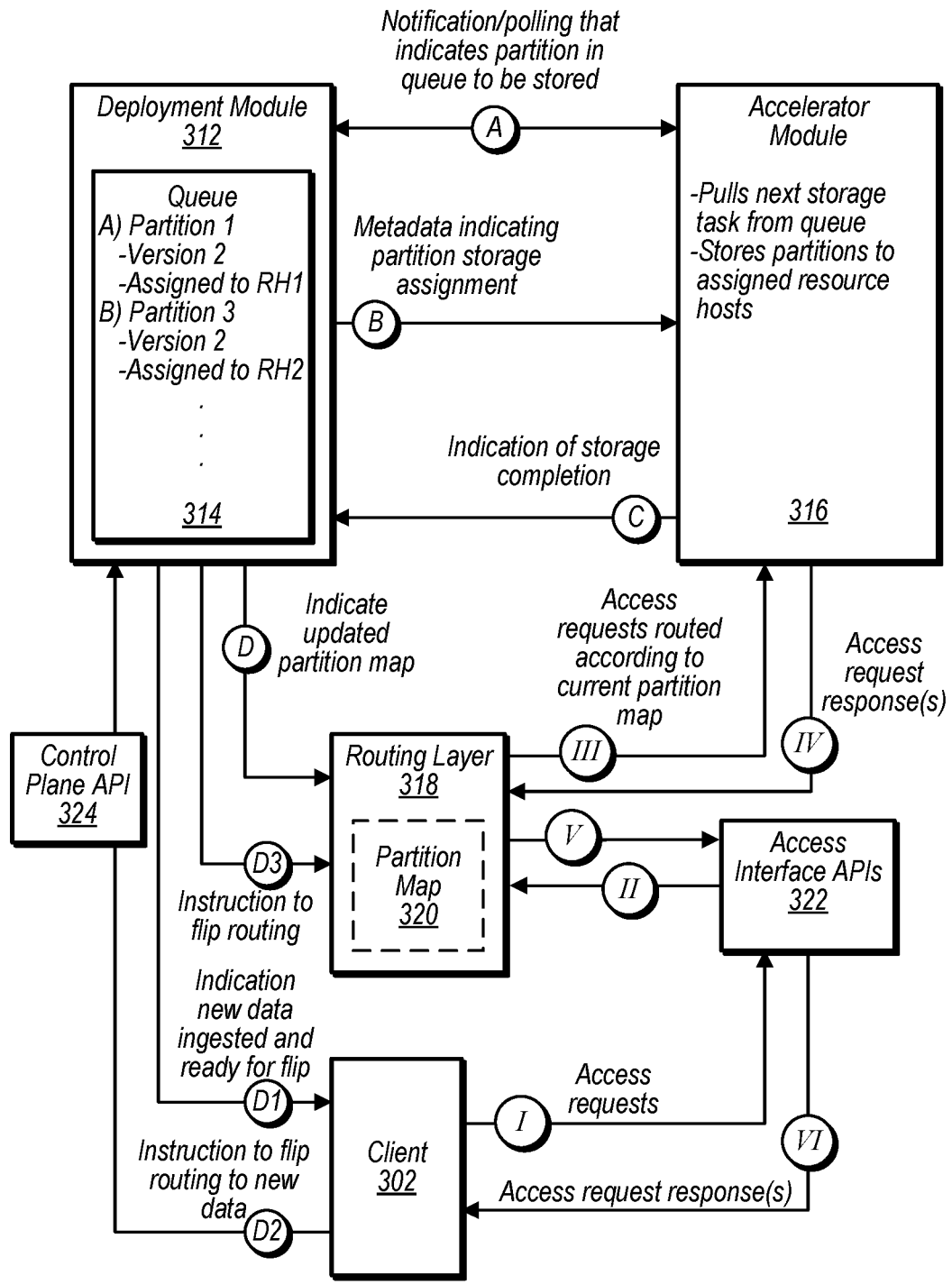
FIG. 3C illustrates another portion of a bulk ingestion process that causes formatted datasets to be deployed to resource hosts of a distributed data storage system, wherein the formatted datasets are made available for client access requests, according to some embodiments.

FIG. 3C illustrates another portion of a bulk ingestion process that causes formatted datasets to be deployed to resource hosts of a distributed data storage system, wherein the formatted datasets are made available for client access requests, according to some embodiments.

FIG. 3C illustrates a similar process as described in FIG. 3B. However, as shown in FIG. 3C, a client may select a feature of a bulk ingestion interface that allows the client to control when a distributed data storage system "flips" to a next version. For example, at "D1" deployment module 312 may indicate to client 302 that submitted raw/new bulk data has been ingested and is ready to be "flipped to", but may refrain from flipping the distributed data storage system until instructed to do so by client 302.

At "D2" client 302 may provide an instruction to the deployment module 312, for example via a control plane API, to flip the distributed data storage system to the newest version of the data stored in the distributed data storage system. For example, in the case of a database, the database may be "flipped" to include the recently ingested bulk data. Because the resource hosts store both the recently ingested partitions and previous partitions and because the routing layer 318 stores both an updated partition map 318 and one or more previous partition maps, such as a current partition map in use prior to the bulk data being ingested, the distributed data storage system may route access requests to multiple versions depending which partition map version is used to route the access requests.

At "D3" in response to the client sending the instruction at "D2" to flip to the new data version, the deployment module 312 sends an instruction to the routing layer 318 to "flip" to the next version of the partition map. In response, client access requests such as in "I-VI" are routed according the next version of the partition map.

Figure 3D:
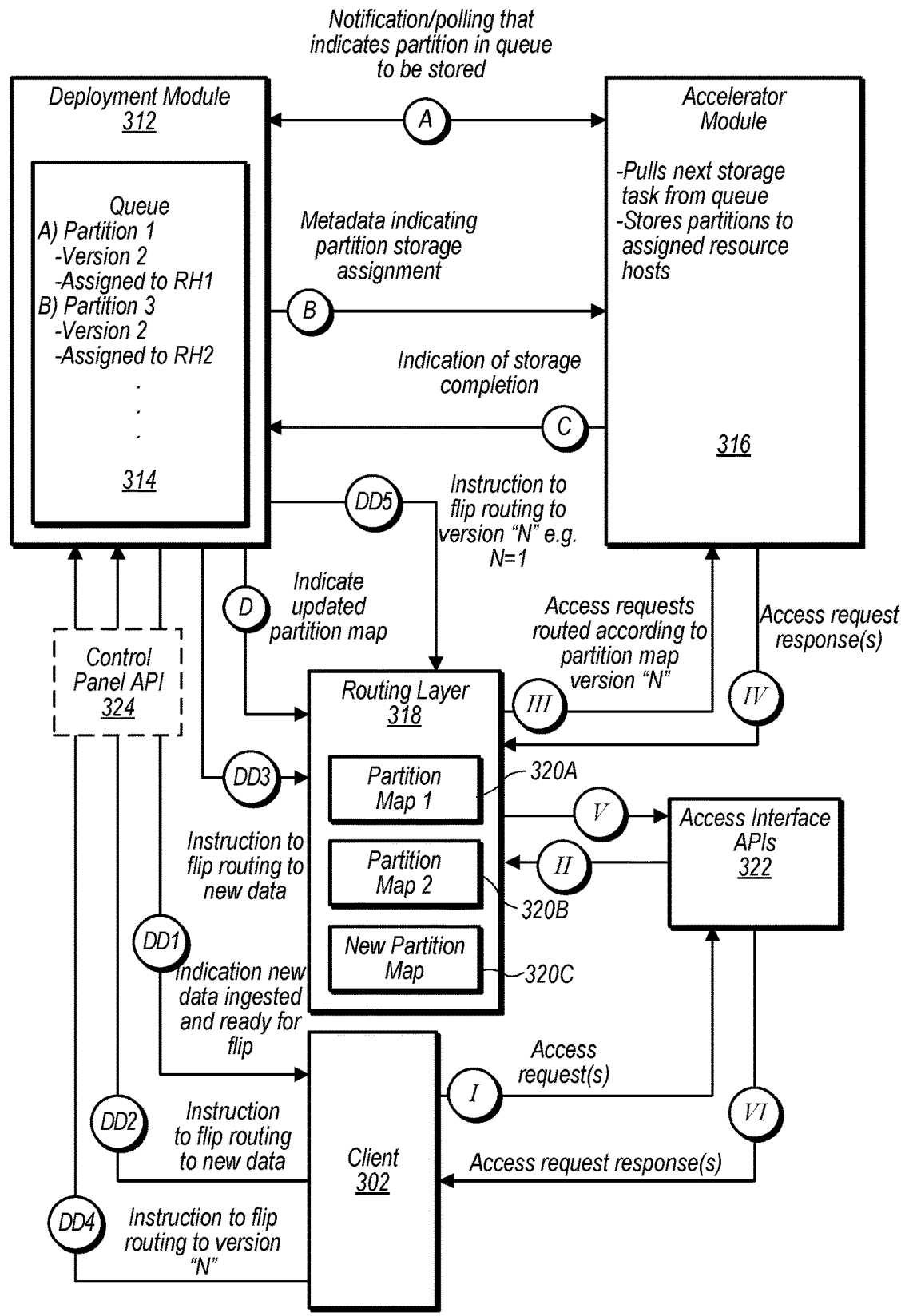
FIG. 3D illustrates another portion of a bulk ingestion process that causes formatted datasets to be deployed to resource hosts of a distributed data storage system, wherein the formatted datasets are made available for client access requests, and wherein the client can specify a version of the datasets/database to be made available for the client access requests, according to some embodiments.

FIG. 3D illustrates another portion of a bulk ingestion process that causes formatted datasets to be deployed to resource hosts of a distributed data storage system, wherein the formatted datasets are made available for client access requests, and wherein the client can specify a version of the datasets/database to be made available for the client access requests, according to some embodiments.

In some embodiments, a client may control when a distributed data storage system, such as a database, is flipped to a new version, as described in FIG. 3B and/or additionally revert a distributed data storage system, such as a database, to a previous version.

For example, at "DD1" a deployment module 312 may indicate to a client 302 that recently ingested bulk data has been ingested and is ready to be "flipped to". At "DD2" the client may provide an instruction to the deployment module 312 to "flip" to the new data version. At "DD3", the deployment module 312 may instruct the routing layer 318 to begin routing access requests according to new partition map 320C.

At "DD4" the client 302 may send an instruction to deployment module 312 to revert the distributed data storage system, such as a database, back to a previous version "N", wherein "N" is one of a plurality of previous versions stored by the distributed data storage system. In some embodiments, a distributed data storage system may store "M" versions of a partition, and remove one of the "M" previous partition versions when an "M+1" partition version is stored. For example, in some embodiments an oldest partition version may be removed when a new partition version is stored that exceeds the supported number of versions "N." In addition, in some embodiments, a routing layer of a distributed data storage system may store "X" partition map versions, wherein an oldest partition map version is removed when an "X+1" partition map version is stored to a routing layer.

In some embodiments, instructions from a client to a deployment module, such as instructions between client 302 and deployment module 312, may be routed via a control plane API 324.

At "DD5" the deployment module may instruct the routing layer to revert to a previous partition map version, such as partition map 1 (320A). Accordingly, client access requests received at routing layer 318 may be routed at "III" according to the selected partition map version.

Figure 4:
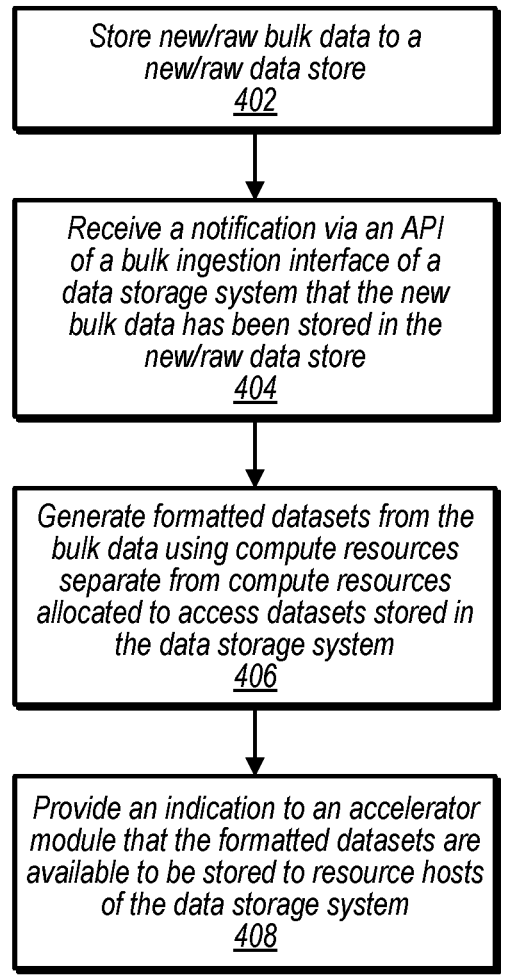
FIG. 4 is a flowchart illustrating a method for bulk ingestion of raw/new data into a distributed data storage system via a bulk ingestion interface, according to some embodiments.

FIG. 4 is a flowchart illustrating a method for bulk ingestion of raw data into a distributed data storage system via a bulk ingestion interface, according to some embodiments.

At 402, a client stores raw/new data to a raw/new data store. The raw/new data store may be included in a bulk ingestion interface, or may be a separate data storage accessible to a bulk ingestion interface.

At 404, the bulk ingestion interface receives a notification via an API that new/raw bulk data is to be ingested into a distributed data storage system. The notification may indicate where the new/raw bulk data is stored, such as a storage location in a raw/new data store, or such as object identifiers for objects stored in the raw/new data store that include the bulk data that is to be ingested.

At 406, the bulk ingestion interface generates formatted datasets from the bulk data. To do this, the bulk ingestion interface uses compute resources that are separate from compute resources used to respond to access requests directed to datasets already stored in the distributed data storage system. For example, computing resources that implement a data transformation module 140, deployment module 144, and/or control plane 142, may be separate computing resources than computing resources that implement access interface 110 and request processors 126.

At 408, the bulk ingestion interface provides an indication to an accelerator module, such as accelerator module 116, that the formatted (and partitioned) datasets are available to be stored to resource hosts of the distributed data storage system.

Figure 5:
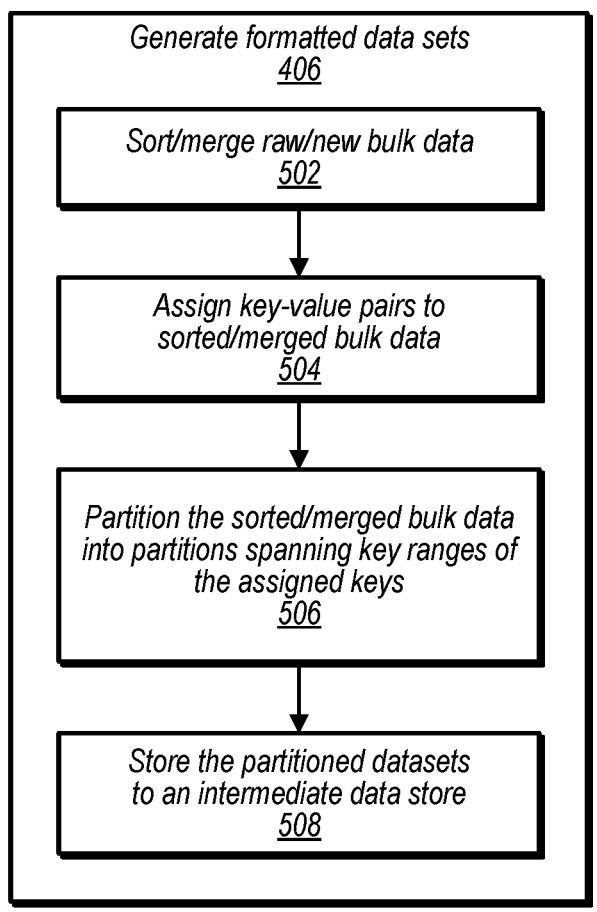
FIG. 5 is a flowchart illustrating further details for generating formatted datasets from bulk raw/new data, according to some embodiments.

FIG. 5 is a flowchart illustrating further details for generating formatted datasets from bulk raw data, according to some embodiments. FIG. 5 illustrates further details regarding generating formatted datasets at 406.

At 502, a data transformation module of a bulk ingestion interface sorts and merges raw/new bulk data. For example, the raw/new bulk data may be stored in a raw/new data store as a plurality of storage objects each comprising a plurality of data elements, such as JSON objects, comma separated values (CSV), tab separated values (TSV), etc. In some embodiments, the data transformation module may merge the JSON, CSV values, TSV values, etc. of multiple storage objects and also sort the JSON objects, CSV values, TSV values.

At 504, the data transformation module may assign keys to the data elements of the JSON objects, CSV values, TSV values, etc. Thus, the resulting datasets may comprise key-value pairs.

At 506, the data transformation module or the deployment module, may partition the datasets into a plurality of partitions. In some embodiments, the datasets may be partitioned based on key ranges, wherein each partition spans a particular key range. In some embodiments, partitions may be determined based on client configuration requirements, resource host infrastructure characteristics (e.g. storage availability, IOPs capacity, etc.), and system performance capabilities.

At 508, the partitioned datasets may be stored in an intermediate data store, such as intermediate data store 138.

Figure 6:
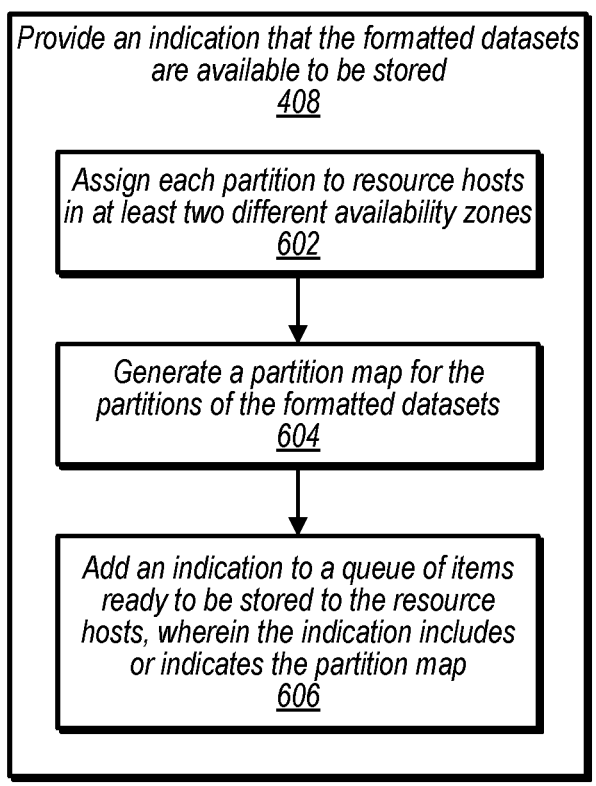
FIG. 6 is a flowchart illustrating further details for providing an indication that one or more formatted datasets generated from bulk raw/new data are available to be stored in a distributed data storage system, according to some embodiments.

FIG. 6 is a flowchart illustrating further details for providing an indication that one or more formatted datasets generated from bulk raw data are available to be stored in a distributed data storage system, according to some embodiments. FIG. 6 illustrates further details regarding providing an indication that the formatted datasets are available to be stored as described at 408 in FIG. 4.

At 602, a deployment module of a bulk ingestion interface, such as deployment module 144, assigns each partition of the formatted dataset to multiple resource hosts in at least two different availability zones. In some embodiments, each partition is assigned to three different resource hosts in three different availability zones to ensure durability of the stored data.

At 604, the deployment module generates a partition map reflecting the partition assignments made at 602.

At 606, the deployment module adds an entry to a deployment queue for one or more partitions to be stored to resource hosts of the distributed data storage system. In some embodiments, the entry may further include or link to a partition map update that includes the one or more partitions to be stored to the resource hosts.

Figure 7:
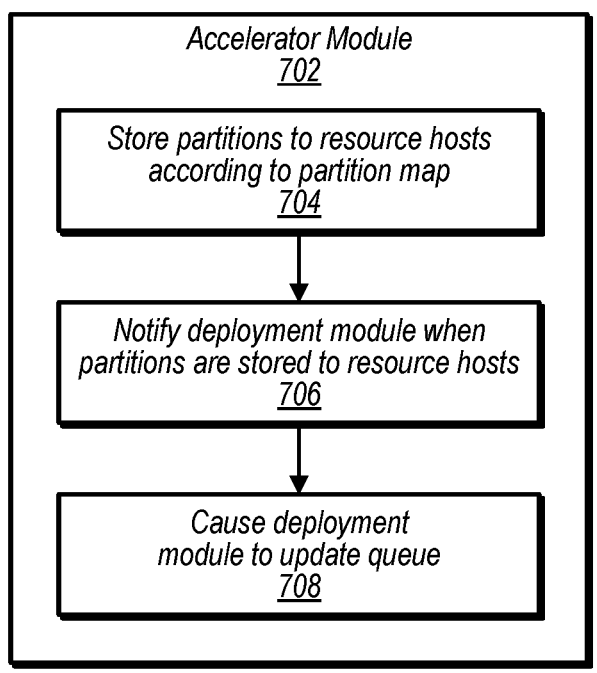
FIG. 7 is a flowchart illustrating further details of actions performed by an accelerator module of a distributed data storage system, according to some embodiments.

FIG. 7 is a flowchart illustrating further details of actions performed by an accelerator module of a distributed data storage system, according to some embodiments. FIG. 7 illustrates actions which may be performed by an accelerator module 702, which may be the same as or similar to accelerator module 116 described in FIG. 1 and accelerator module 316 described in FIGS. 3B-3D.

At 704, the accelerator module stores one or more partitions to resource hosts of the distributed data storage system from an intermediate data store according to a partition map or deployment queue entry generated by a deployment module.

At 706, the accelerator module notifies the deployment module that the one or more partitions have been stored to the assigned resource hosts, and in conjunction with 706, at 708, the accelerator module causes the deployment module to update the deployment queue to reflect that the deployment task to store the partitions has been completed. For example, the deployment task to store the partitions may be removed from the deployment queue.

Figure 8:
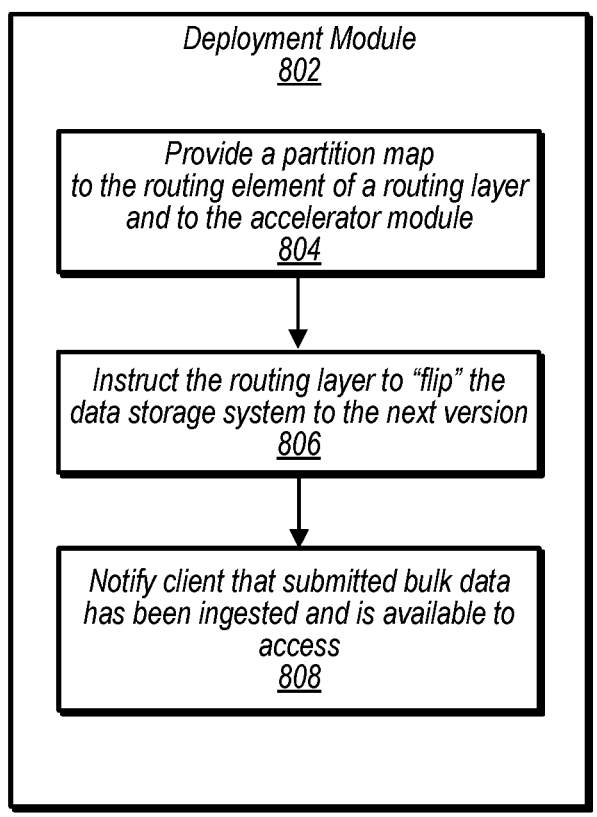
FIG. 8 is a flowchart illustrating further details of actions performed by a routing element of a distributed data storage system, according to some embodiments.

FIG. 8 is a flowchart illustrating further details of actions performed by a routing element of a distributed data storage system, according to some embodiments. FIG. 8 illustrates actions which may be performed by a deployment module 802, which may be the same as or similar to deployment module 144 described in FIG. 1 and deployment module 312 described in FIGS. 3B-3D.

At 804, the deployment module provides to a routing element of a routing layer, such as a router device, a new or updated partition map that reflects mappings of the ingested bulk data.

At 806, the deployment module instructs the routing layer to "flip" the data storage system to the next version. In order to "flip" the data storage system to the next version, the routing layer may begin to route access requests according to the newly provided partition map.

At 808, the deployment module notifies the client that the client's database or other data storage, has been flipped to the next version such that the bulk data that has been ingested is available to be accessed by the client.

Figure 9A:
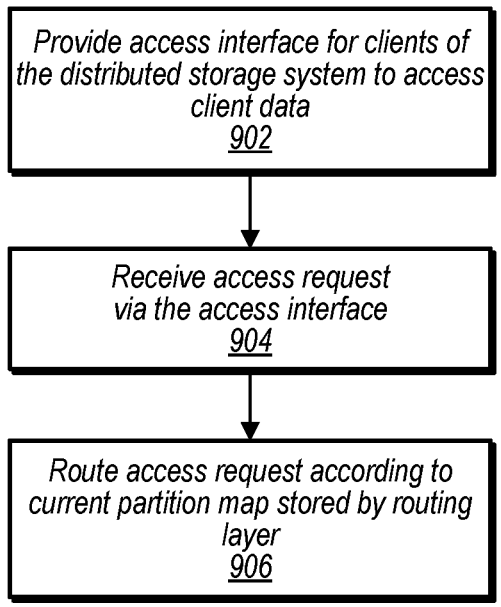
FIG. 9A is a flowchart illustrating actions associated with routing of access requests, according to some embodiments.

FIG. 9A is a flowchart illustrating actions associated with routing of access requests, according to some embodiments.

At 902 a distributed data storage service provides an access interface to one or more clients to access datasets stored by the distributed data storage system for the clients.

At 904, the access interface receives an access request and at 906, the access request is routed by a routing layer (e.g. routing element) according to a currently in-use partition map to a resource host storing a partition that includes a data element targeted by the access request.

Figure 9B:
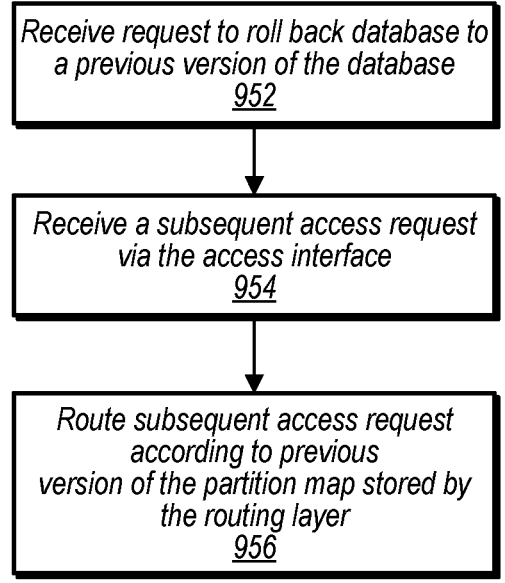
FIG. 9B is a flowchart illustrating actions associated with routing of access requests according to a previous version, according to some embodiments.

FIG. 9B is a flowchart illustrating actions associated with routing of access requests according to a previous version, according to some embodiments.

At 952, the distributed data storage system may receive a request to roll the distributed data storage system back to a previous version. For example, in the case of a database, the database may be rolled back to a previous version of the database. In some embodiments, rolling back the database or data storage system may include exchanging a currently in-use partition map for a previous version of the partition map at the routing layer.

At 954, another access request is received via the access interface and at 956, the other access request is routed by a routing layer according to a previous partition map version to a resource host storing a partition that includes a data element targeted by the other access request.

Illustrative Computer System

Figure 10:
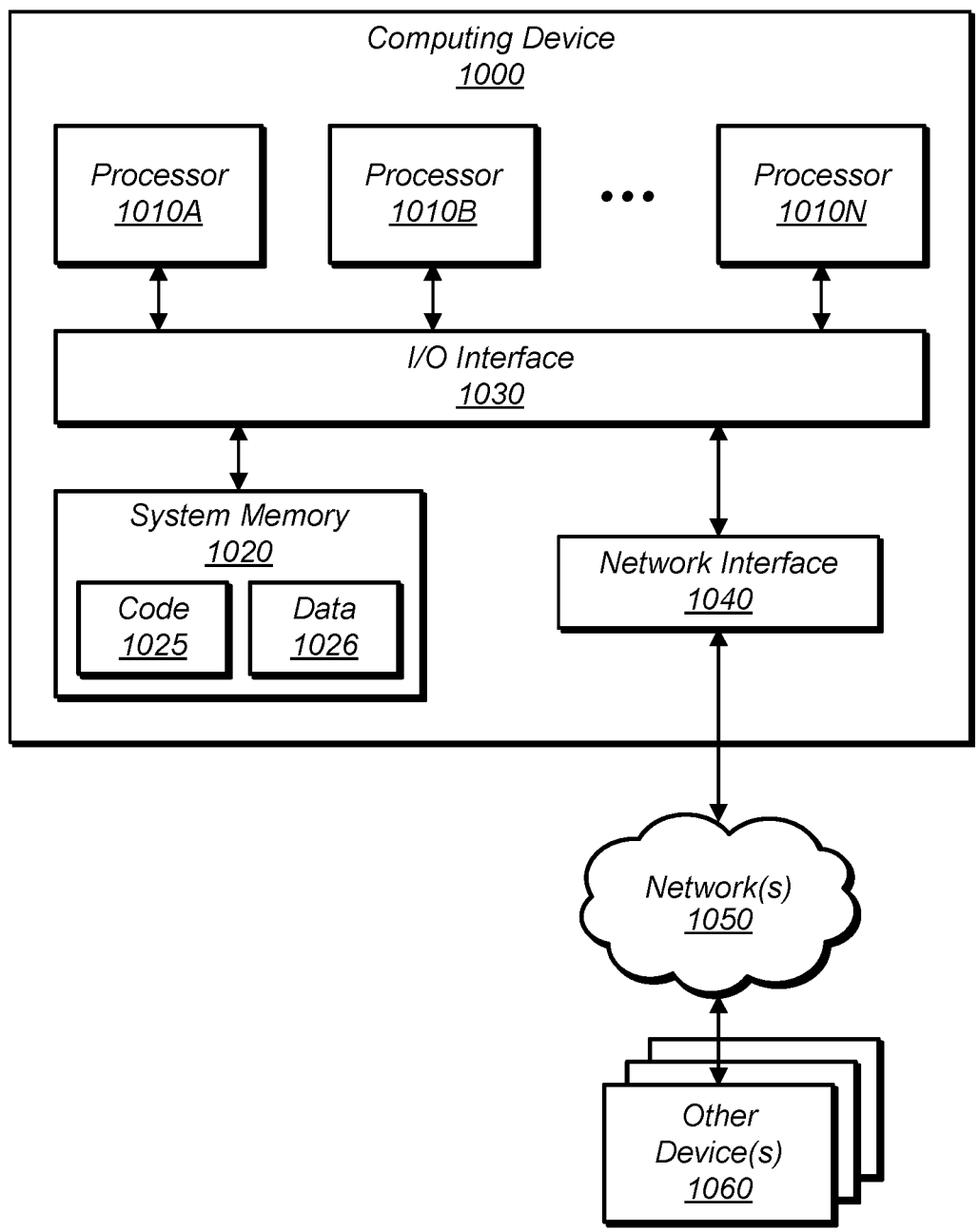
FIG. 10 illustrates an example computing device that may be used in some embodiments.

In at least some embodiments, a computer system that implements a portion or all of one or more of the technologies described herein may include a computer system that includes or is configured to access one or more computer-readable media. FIG. 10 illustrates such a computing device 1000. In the illustrated embodiment, computing device 1000 includes one or more processors 1010A-1010N coupled to a system memory 1020 via an input/output (I/O) interface 1030. Computing device 1000 further includes a network interface 1040 coupled to I/O interface 1030.

In various embodiments, computing device 1000 may be a uniprocessor system including one processor or a multiprocessor system including several processors 1010A-1010N (e.g., two, four, eight, or another suitable number). Processors 1010A-1010N may include any suitable processors capable of executing instructions. For example, in various embodiments, processors 1010A-1010N may be processors implementing any of a variety of instruction set architectures (ISAs), such as the x86, PowerPC, SPARC, or MIPS ISAs, or any other suitable ISA. In multiprocessor systems, each of processors 1010A-1010N may commonly, but not necessarily, implement the same ISA.

System memory 1020 may be configured to store program instructions and data accessible by processor(s) 1010A-1010N. In various embodiments, system memory 1020 may be implemented using any suitable memory technology, such as static random access memory (SRAM), synchronous dynamic RAM (SDRAM), nonvolatile/Flash-type memory, or any other type of memory. In the illustrated embodiment, program instructions and data implementing one or more desired functions, such as those methods, techniques, and data described above, are shown stored within system memory 1020 as code (i.e., program instructions) 1025 and data 1026.

In one embodiment, I/O interface 1030 may be configured to coordinate I/O traffic between processors 1010A-1010N, system memory 1020, and any peripheral devices in the device, including network interface 1040 or other peripheral interfaces. In some embodiments, I/O interface 1030 may perform any necessary protocol, timing or other data transformations to convert data signals from one component (e.g., system memory 1020) into a format suitable for use by another component (e.g., processor 1010). In some embodiments, I/O interface 1030 may include support for devices attached through various types of peripheral buses, such as a variant of the Peripheral Component Interconnect (PCI) bus standard or the Universal Serial Bus (USB) standard, for example. In some embodiments, the function of I/O interface 1030 may be split into two or more separate components, such as a north bridge and a south bridge, for example. Also, in some embodiments some or all of the functionality of I/O interface 1030, such as an interface to system memory 1020, may be incorporated directly into processors 1010A-1010N.

Network interface 1040 may be configured to allow data to be exchanged between computing device 1000 and other devices 1060 attached to a network or networks 1050. In various embodiments, network interface 1040 may support communication via any suitable wired or wireless general data networks, such as types of Ethernet network, for example. Additionally, network interface 1040 may support communication via telecommunications/telephony networks such as analog voice networks or digital fiber communications networks, via storage area networks such as Fibre Channel SANs, or via any other suitable type of network and/or protocol.

In some embodiments, system memory 1020 may be one embodiment of a computer-readable (i.e., computer-accessible) medium configured to store program instructions and data as described above for implementing embodiments of the corresponding methods and apparatus. However, in other embodiments, program instructions and/or data may be received, sent or stored upon different types of computer-readable media. Generally speaking, a computer-readable medium may include non-transitory storage media or memory media such as magnetic or optical media, e.g., disk or DVD/CD coupled to computing device 1000 via I/O interface 1030. A non-transitory computer-readable storage medium may also include any volatile or non-volatile media such as RAM (e.g. SDRAM, DDR SDRAM, RDRAM, SRAM, etc.), ROM, etc., that may be included in some embodiments of computing device 1000 as system memory 1020 or another type of memory. Further, a computer-readable medium may include transmission media or signals such as electrical, electromagnetic, or digital signals, conveyed via a communication medium such as a network and/or a wireless link, such as may be implemented via network interface 1040. Portions or all of multiple computing devices such as that illustrated in FIG. 10 may be used to implement the described functionality in various embodiments; for example, software components running on a variety of different devices and servers may collaborate to provide the functionality. In some embodiments, portions of the described functionality may be implemented using storage devices, network devices, or various types of computer systems. The term "computing device," as used herein, refers to at least all these types of devices, and is not limited to these types of devices.

The various methods as illustrated in the Figures and described herein represent examples of embodiments of methods. The methods may be implemented in software, hardware, or a combination thereof. In various ones of the methods, the order of the steps may be changed, and various elements may be added, reordered, combined, omitted, modified, etc. Various ones of the steps may be performed automatically (e.g., without being directly prompted by user input) and/or programmatically (e.g., according to program instructions).

The terminology used in the description of the invention herein is for the purpose of describing particular embodiments only and is not intended to be limiting of the invention. As used in the description of the invention and the appended claims, the singular forms "a", "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" may be construed to mean "when" or "upon" or "in response to determining" or "in response to detecting," depending on the context. Similarly, the phrase "if it is determined" or "if [a stated condition or event] is detected" may be construed to mean "upon determining" or "in response to determining" or "upon detecting [the stated condition or event]" or "in response to detecting [the stated condition or event]," depending on the context.

It will also be understood that, although the terms first, second, etc., may be used herein to describe various elements, these elements should not be limited by these terms. These terms are only used to distinguish one element from another. For example, a first contact could be termed a second contact, and, similarly, a second contact could be termed a first contact, without departing from the scope of the present invention. The first contact and the second contact are both contacts, but they are not the same contact.

Numerous specific details are set forth herein to provide a thorough understanding of claimed subject matter. However, it will be understood by those skilled in the art that claimed subject matter may be practiced without these specific details. In other instances, methods, apparatus, or systems that would be known by one of ordinary skill have not been described in detail so as not to obscure claimed subject matter. Various modifications and changes may be made as would be obvious to a person skilled in the art having the benefit of this disclosure. It is intended to embrace all such modifications and changes and, accordingly, the above description is to be regarded in an illustrative rather than a restrictive sense.

What is claimed is:

1. A method, comprising:
routing, using a routing layer of an access interface of a data storage system, access requests from a client of the data storage system based on one or more partition maps available to the routing layer of the access interface of the data storage system, wherein the access interface is implemented using one or more computing devices;
ingesting, using a bulk ingestion interface of the data storage system that is separate from the access interface, bulk data received from the client to be stored on one or more of resource hosts of the data storage system, wherein the bulk ingestion interface is implemented using one or more other computing devices;
determining a new partition map that includes the ingested bulk data; and providing a flip over instruction to the routing layer to switch routing of subsequent requests based on the new partition map.

2. The method of claim 1, wherein providing the flip over instruction to the routing layer comprises automatically providing the flip over instruction to the routing layer to switch over to the new partition map in response to the determination of the new partition map.

3. The method of claim 1, wherein providing the flip over instruction to the routing layer comprises providing the flip over instruction to the routing layer based at least in part on an instruction from the client.

4. The method of claim 3, wherein the instruction from the client is received in response to an indication to the client that the bulk data has been ingested.

5. The method of claim 3, further comprising:
providing a revert instruction, based at least in part on an instruction from the client, to the routing layer to switch routing of subsequent requests received based on one or more partition maps previously stored.

6. The method of claim 3, further comprising:
providing a revert instruction, based at least in part on an instruction from the client, to the routing layer to switch routing of subsequent requests based on a specific one of one or more partitions maps previously stored.

7. A system comprising:
a plurality of resource hosts configured to store datasets for clients of a data storage system;
one or more computing devices configured to implement an access interface for the data storage system, wherein the access interface is configured to:
receive access requests from respective ones of the clients of the data storage system; and
route the requests to respective ones of the resource hosts based on one or more partition maps available to a routing layer of the access interface; and
one or more other computing devices configured to implement a bulk ingestion interface for the data storage system, wherein the bulk ingestion interface is separate from the access interface and configured to:
ingest bulk data received from a give one of the clients, wherein the ingested bulk data is stored on two or more of the resource hosts of the data storage system; and
determine a new partition map that includes the ingested bulk data for one or more of the given client's datasets;
wherein the routing layer is configured to:
receive an indication of the new partition map from the bulk ingestion interface;
store the new partition map, while continuing to route requests received from the given client based on one of one or more partitions maps previously stored; and
switch routing of subsequent requests received from the given client, in response to receiving a flip over instruction, such that the subsequent requests are routed based on the new partition map for the one or more datasets of the given client.

8. The system of claim 7, wherein the bulk ingestion interface is configured to:
automatically provide the flip over instruction to the routing layer to switch to the new partition map subsequent to ingesting the bulk data and determining the new partition map.

9. The system of claim 7, wherein the bulk ingestion interface is configured to:
receive an instruction from the given client for flipping the given client's one or more datasets to a version of the one or more datasets that includes the ingested bulk data; and
provide the flip over instruction to the routing layer based on the instruction received from the given client.

10. The system of claim 9, wherein the bulk ingestion interface is configured to:
provide an indication to the given client that the bulk data has been ingested;
refrain from providing the flip over instruction to the routing layer until receiving the instruction from the given client; and
provide, in response to receiving the instruction from the given client, the flip over instruction to the routing layer.

11. The system of claim 9, wherein the bulk ingestion interface is further configured to:
provide a revert instruction to the routing layer to switch routing of subsequent requests such that the subsequent requests are routed based on one or more of the partition maps previously stored for the given client's one or more datasets.

12. The system of claim 11, wherein the bulk ingestion interface if further configured to:
receive an instruction from the given client to revert the given client's one or more datasets to a version prior to the bulk ingestion, and
provide the revert instruction in response to receiving the instruction from the given client to revert the given client's one or more datasets to the version prior to the bulk ingestion.

13. The system of claim 9, wherein the bulk ingestion interface is further configured to:
receive an instruction from the given client to revert the given client's one or more datasets to a specific one of a plurality of previous versions of the given client's one or more datasets; and
provide a revert instruction, based at least in part on receiving the revert instruction from the given client, to the routing layer to switch routing of subsequent requests based on a specific one of the one or more partitions maps previously stored for the given client's one or more datasets.

14. The system of claim 7, wherein to ingest the new bulk data, the bulk data ingestion interface is configured to generate one or more formatted datasets from the bulk data, wherein the bulk data is formatted according to javascript object notation (JSON), a comma separated values (CSV) notation, or a tab separated values (TSV) notation, and wherein the formatted datasets are formatted in a read-only database format comprising data organized via key-value pairs.

15. One or more non-transitory, computer readable media, storing program instructions that when executed on or across one or more computing devices, cause the one or more computing devices to implement:
routing, using a routing layer of an access interface of a data storage system, access requests from a client of the data storage system based on one or more partition maps available to the routing layer of the access interface of the data storage system, wherein the access interface is implemented using one or more computing devices;
ingesting, using a bulk ingestion interface of the data storage system that is separate from the access interface, bulk data received from the client to be stored on one or more of resource hosts of the data storage system, wherein the bulk ingestion interface is implemented using one or more other computing devices;

determining a new partition map that includes the ingested bulk data; and providing a flip over instruction to the routing layer to switch routing of subsequent requests from the client based on the new partition map.

16. The one or more non-transitory, computer readable media of claim 15, wherein providing the flip over instruction to the routing layer comprises automatically providing the flip over instruction to the routing layer to switch over to the new partition map in response to the determination of the new partition map.

17. The one or more non-transitory, computer readable media of claim 15, wherein providing the flip over instruction to the routing layer comprises providing the flip over instruction to the routing layer based at least in part on an instruction from the client.

18. The one or more non-transitory, computer readable media of claim 17, wherein the instruction from the client is received in response to an indication to the client that the bulk data has been ingested.

19. The one or more non-transitory, computer readable media of claim 17, further storing program instructions that when executed on or across the one or more computing devices, cause the one or more computing devices to implement:

providing a revert instruction, based at least in part on an instruction from the client, to the routing layer to switch routing of subsequent requests based on the one of the one or more partition maps previously stored.

20. The one or more non-transitory, computer readable media of claim 17, further storing program instructions that when executed on or across the one or more computing devices, cause the one or more computing devices to implement:

providing a revert instruction, based at least in part on an instruction from the client, to the routing layer to switch routing of subsequent requests based on a specific one of one or more partitions maps previously stored.

* * * * *